United States Patent
Liu et al.

(10) Patent No.: US 9,258,050 B2
(45) Date of Patent: Feb. 9, 2016

(54) TRANSCEIVING MODULE, ANTENNA, BASE STATION AND SIGNAL RECEIVING METHOD

(71) Applicant: Huawei Technologies Co., Ltd., Shenzhen (CN)

(72) Inventors: Dezheng Liu, Shanghai (CN); Tao Pu, Shanghai (CN); Weihua Sun, Shenzhen (CN); Zuojun Qin, Shanghai (CN); Pinghua He, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 0 days.

(21) Appl. No.: 14/502,179

(22) Filed: Sep. 30, 2014

(65) Prior Publication Data

US 2015/0017920 A1 Jan. 15, 2015

Related U.S. Application Data

(63) Continuation of application No. PCT/CN2012/073494, filed on Apr. 1, 2012.

(51) Int. Cl.
*H04B 1/00* (2006.01)
*H04B 15/00* (2006.01)
(Continued)

(52) U.S. Cl.
CPC .............. *H04B 7/0885* (2013.01); *H01Q 1/246* (2013.01); *H01Q 3/26* (2013.01); *H01Q 3/40* (2013.01); *H01Q 25/001* (2013.01); *H04B 1/3805* (2013.01); *H04B 7/12* (2013.01)

(58) Field of Classification Search
CPC .................. H04B 7/10; H04B 1/3805; H04B 2201/70715; H04B 7/0885; H04B 7/12; H01Q 25/001; H01Q 25/02; H01Q 25/007; H01Q 3/04

USPC ........... 455/63.4, 88, 562.1, 561, 575.7, 13.3, 455/19, 25, 82, 83; 343/757, 700 R, 368, 343/718, 782, 876; 342/74, 153, 383
See application file for complete search history.

(56) References Cited

U.S. PATENT DOCUMENTS

| 8,090,326 B1 | 1/2012 | Wu et al. |
| 2002/0137472 A1 | 9/2002 | Quinn et al. |

(Continued)

FOREIGN PATENT DOCUMENTS

| CN | 101018370 A | 8/2007 |
| CN | 101023559 A | 8/2007 |

(Continued)

*Primary Examiner* — Shaima Q Aminzay
(74) *Attorney, Agent, or Firm* — Slater & Matsil, L.L.P.

(57) ABSTRACT

Embodiments of the present invention relate to the field of wireless communication technologies, and provide a transceiving module, an antenna, a base station and a signal receiving method, which are capable of implementing receiving of four dual-band signals and improving uplink network performance of a base station. The transceiving module includes a combining-splitting network, a set of transceiving unit arrays and a signal processing unit that are connected to each other in sequence, and further includes a combining network setting with a connection point connected to another transceiving module, a co-element filter unit separately connected to the combining-splitting network and the combining network, and a pair of receiving units connected to the signal processing unit, where the pair of receiving units in the transceiving module is disposed with a connection point connected to the another transceiving module. The embodiments of the present invention apply to the field of communication.

19 Claims, 6 Drawing Sheets

(51) Int. Cl.
*H04B 7/08* (2006.01)
*H01Q 3/26* (2006.01)
*H04B 1/3805* (2015.01)
*H04B 7/12* (2006.01)
*H01Q 1/24* (2006.01)
*H01Q 3/40* (2006.01)
*H01Q 25/00* (2006.01)

(56) References Cited

U.S. PATENT DOCUMENTS

2008/0026796 A1 1/2008 Thomas
2009/0066595 A1 3/2009 Barker et al.
2010/0022197 A1 1/2010 Kato et al.
2012/0157013 A1 6/2012 Wu et al.

FOREIGN PATENT DOCUMENTS

| | | |
|---|---|---|
| CN | 101072413 A | 11/2007 |
| CN | 101507143 A | 8/2009 |
| CN | 102104392 A | 6/2011 |
| EP | 1206050 A1 | 5/2002 |
| JP | 7254816 A | 10/1995 |
| JP | 200346422 A | 2/2003 |
| WO | 0131807 A2 | 5/2001 |
| WO | 2008020178 A1 | 2/2008 |
| WO | 2008032710 A1 | 3/2008 |

TRANSCEIVING MODULE, ANTENNA, BASE STATION AND SIGNAL RECEIVING METHOD

This application is a continuation of International Application No. PCT/CN2012/073494, filed on Apr. 1, 2012, which is hereby incorporated by reference in its entirety.

TECHNICAL FIELD

The present invention relates to the field of wireless communication technologies, and in particular, to a transceiving module, an antenna, a base station and a signal receiving method.

BACKGROUND

A wireless distributed base station system adopts split-structured design of a radio remote unit (RRU) and a baseband processing unit (BBU). Correspondingly, a base station antenna system may adopt design of an RRU integrated with an antenna. Antenna systems that meet this design requirement include an integrated antenna system and an active antenna system (AAS).

Figure 1:
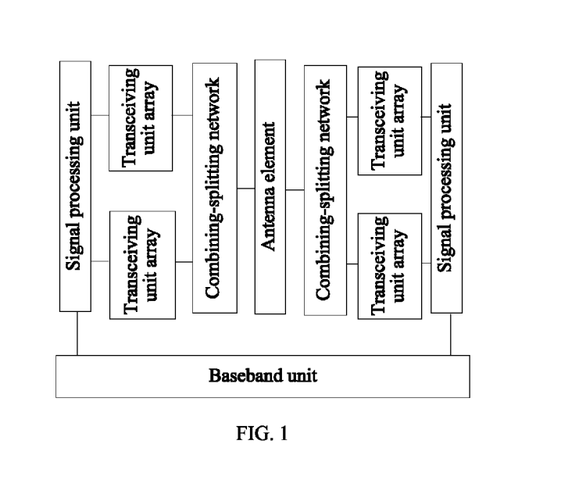
FIG. 1 is a simplified block diagram of an antenna in the prior art.

Currently, the AAS is widely applied in wireless distributed base stations because the active antenna system has a higher network performance gain than a passive antenna. An existing AAS is capable of implementing a performance gain of receiving two dual-band signals. As shown in FIG. 1, the existing AAS adopts two arrays of antennas, where each array of antenna and a set of transceiving unit (referred to as TRX) arrays form a single-band active antenna. Each array of antenna includes n antenna elements that have two polarization directions, each set of transceiving unit TRX arrays include 2m TRX transceiving units, and every m TRX transceiving units correspond to a polarization direction. Radio-frequency signals received by the n antenna elements in a same polarization direction are sent to m TRX transceiving units via a combining-splitting network, and the m TRX transceiving units send the received radio-frequency signals to a signal processing unit for processing, to implement receiving of one single-band signal. Each antenna element of each array of antenna has two polarization directions, so that receiving of two single-band signals can be implemented. The two arrays of antennas are capable of implementing receiving of two dual-band signals. However, with the expansion of uplink network performance of a base station, implementation of receiving only two signals cannot meet a requirement of the uplink network performance of the base station.

SUMMARY

Embodiments of the present invention provide a transceiving module, an antenna, a base station and a signal receiving method, so as to implement receiving of at least four signals with more than one band, thereby improving uplink network performance of a base station.

Further embodiments of the present invention provide a transceiving module, including a combining-splitting network, a set of transceiving unit arrays and a signal processing unit that are connected to each other in sequence, and further including a combining network disposed with a connection point connected to another transceiving module, a co-element filter unit separately connected to the combining-splitting network and the combining network, and a pair of receiving units connected to the signal processing unit, where the pair of receiving units in the transceiving module is disposed with a connection point connected to the another transceiving module, where the co-element filter unit includes at least one co-element filter, and is configured to divide two radio-frequency signals received from two polarization directions of antenna elements into two first band radio-frequency signals and two second band radio-frequency signals, where each signal corresponds to a polarization direction, send the two first band radio-frequency signals to the combining-splitting network, and send the two second band radio-frequency signals to the combining network, so that the two first band radio-frequency signals are input to the signal processing unit after being processed by the combining-splitting network and the transceiving unit arrays, the pair of receiving units is configured to receive two first band radio-frequency signals which are sent by a combining network in the another transceiving module and correspond to the two polarization directions of the antenna elements respectively, process the first band radio-frequency signals, and send the processed first band radio-frequency signals to the signal processing unit, and the combining network is configured to combine second band radio-frequency signals which are sent by the co-element filter unit and correspond to a same polarization direction of the antenna elements, and send the combined signals to a pair of receiving units in the another transceiving module.

Other embodiments of the present invention provide an antenna, including a first transceiving module, and at least one antenna element array connected to the first transceiving module, where the first transceiving module is a transceiving module as described above.

Further embodiments of the present invention provide a base station, including the foregoing antenna.

Yet further embodiments of the present invention provides a signal receiving method, including: dividing, by a first transceiving module, received radio-frequency signals into first band radio-frequency signals and second band radio-frequency signals, where the first band radio-frequency signals include two signals in different polarization directions, and the second band radio-frequency signals include two signals in different polarization directions, sending the second band radio-frequency signals to a pair of receiving units in a second transceiving module, and receiving first band radio-frequency signals sent by the second transceiving module, and processing the first band radio-frequency signals sent by the second transceiving module and the first band radio-frequency signals received by the foregoing first transceiving module, to implement receiving of four first band radio-frequency signals.

In the transceiving module, the antenna, the base station and the signal receiving method provided in the technical solutions of the present invention, for one transceiving module, radio-frequency signals are divided into first band radio-frequency signals and second band radio-frequency signals through multiple co-element filter units, and the first band radio-frequency signals are sent to a set of transceiving unit arrays to implement receiving of two first band radio-frequency signals; first band radio-frequency signals sent by another transceiving module are received through a pair of receiving units, to implement receiving of another two first band radio-frequency signals, thereby implementing receiving of four first band radio-frequency signals; meanwhile, a combining network in the transceiving module sends the second band radio-frequency signals to a pair of receiving units in the another transceiving module, for the pair of receiving units and a signal processing unit that are in the another transceiving module to implement receiving of another two second band radio-frequency signals. Through the foregoing transceiving module, receiving of at least four radio-frequency signals with more than one band is finally achieved, thereby improving the uplink network performance of the base station.

BRIEF DESCRIPTION OF THE DRAWINGS

To illustrate the technical solutions in the embodiments of the present invention or in the prior art more clearly, accompanying drawings required for describing the embodiments or the prior art are briefly introduced below. Apparently, the accompanying drawings in the following description are merely some embodiments of the present invention, and persons of ordinary skill in the art may further obtain other drawings according to the accompanying drawings without creative efforts.

DETAILED DESCRIPTION OF ILLUSTRATIVE EMBODIMENTS

The technical solutions in the embodiments of the present invention are described clearly and completely below with reference to the accompanying drawings in the embodiments of the present invention. Evidently, the embodiments to be described are merely part of rather than all of the embodiments of the present invention. All other embodiments obtained by persons of ordinary skill in the art based on the embodiments of the present invention without creative efforts shall fall within the protection scope of the present invention.

The technical solutions of the present invention may be applied to various communication systems, such as a global system for mobile communications (GSM), a code division multiple access (CDMA) system, a wideband code division multiple access (WCDMA) system, a general packet radio service (GPRS) system and a long term evolution (LTE) system.

A base station may be a base transceiver station (BTS) in the GSM or the CDMA, may also be a NodeB in the WCDMA, and may also be an evolved Node B (eNB or e-NodeB) in the LTE, which is not limited here in the present invention.

Figure 2:
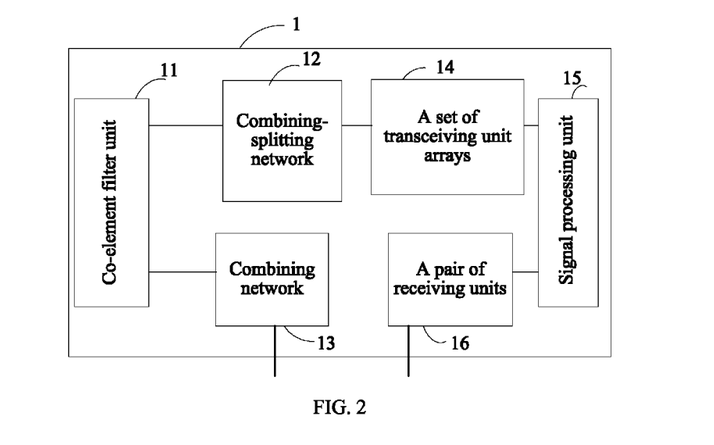
FIG. 2 is a simplified block diagram of a transceiving module according to an embodiment of the present invention.

An embodiment of the present invention is shown in FIG. 2. A transceiving module 1 includes a co-element filter unit 11, a combining-splitting network 12 and a combining network 13 connected to an output port of first band radio-frequency signals and an output port of second band radio-frequency signals of the co-element filter unit 11 respectively, a set of transceiving unit arrays 14 and a signal processing unit 15 that are connected to the combining-splitting network 12 in sequence, and a pair of receiving units 16 connected to the signal processing unit 15. The combining network 13 and the pair of receiving units 16 are separately disposed with a connection point connected to another transceiving module.

The co-element filter unit 11 includes at least one co-element filter, and is configured to divide two radio-frequency signals received from two polarization directions of antenna elements into two first band radio-frequency signals and two second band radio-frequency signals. The co-element filter unit 11 sends the two first band radio-frequency signals to the combining-splitting network 12, and sends the two second band radio-frequency signals to the combining network 13, so that the two first band radio-frequency signals are input to the signal processing unit 15 after being processed by the combining-splitting network 12 and the transceiving unit arrays 14, where processing of the combining-splitting network 12 may include combining processing such as combining two signals to form one signal or combining three signals to form one signal, and input and output ports of the combining processing are not limited here. Processing in the transceiving unit arrays 14 may include processing of converting radio-frequency signals into intermediate-frequency signals, where the intermediate-frequency signals may be analog intermediate-frequency signals or digital intermediate-frequency signals, and may also be other processing, which is not limited here. In embodiments of the present invention, processing or converting radio-frequency signals into intermediate-frequency signals is taken as an example for description. The co-element filter unit 11 may include one co-element filter or multiple co-element filters, where each co-element filter is connected to a same polarization direction of one or multiple antenna elements, and the multiple antenna elements connected to each co-element filter may be adjacent antenna elements. Alternatively, the number of co-element filters may be the same as the number of antenna elements. Each co-element filter may be disposed with two input ports and four output ports, and is configured to receive two radio-frequency signals received from an antenna element in two polarization directions, and divide the received two radio-frequency signals into two first band radio-frequency signals and two second band radio-frequency signals. Optionally, the number of co-element filters may also be set to twice the number of antenna elements. Each co-element filter is disposed with one input port and two output ports, and is configured to receive one radio-frequency signal received from an antenna element in one polarization direction, and divide the received one radio-frequency signal into one first band radio-frequency signal and one second band radio-frequency signal. The foregoing merely provides several optional setting manners of the co-element filter unit 11. It may be understood that, there are multiple manners for setting the number and the ports of co-element filters included in the co-element filter unit, and the present invention is not limited to the foregoing several manners.

The pair of receiving units 16 is separately configured to receive two first band radio-frequency signals in different polarization directions which are sent by a combining network in the another transceiving module, process the first band radio-frequency signals and send the processed first band radio-frequency signals to the signal processing unit 15, where the processing may include converting the first band radio-frequency signals into intermediate-frequency signals, and the intermediate-frequency signals may be analog intermediate-frequency signals or digital intermediate-frequency signals, and may also be other required processing, which is not limited here. In embodiments of the present invention, the process of converting radio-frequency signals into intermediate-frequency signals is only described as an example.

The combining network 13 is configured to combine second band radio-frequency signals in different polarization directions which are sent by the co-element filter unit 11, and send the combined signals to a pair of receiving units in the another transceiving module, where each receiving unit in the pair of receiving unit corresponds to one polarization direction.

The combining-splitting network 12 may be a combining-splitting network in an existing AAS, where its structure and functions, for example, may do the following: When receiving signals, the combining-splitting network 12 is configured to combine m first band radio-frequency signals in a same polarization direction which are sent by the co-element filter unit 11 to form n radio-frequency signal subcomponents, so as to obtain n first band radio-frequency signal subcomponents in each of the two polarization directions, and separately send the n first band radio-frequency signal subcomponents in each of the two polarization directions to n transceiving units in the set of transceiving unit arrays 14; when sending signals, the combining-splitting network 12 is configured to divide first band radio-frequency signal subcomponents sent by n transceiving units in a same transceiving unit array into m signals and send the m signals to the co-element filter unit.

The set of transceiving unit arrays 14 may be a transceiving unit array in the existing AAS, where its structure and functions, for example, may do the following: The set of transceiving unit arrays 14 includes two transceiving unit arrays configured to receive radio-frequency signals which are in different polarization directions, where the number of transceiving units included in each transceiving unit array is the same as the number of ports for outputting, by the combining-splitting network 12, radio-frequency signals which are in one polarization direction, and is n in the embodiment of the present invention. The transceiving units in each transceiving unit array are configured to receive different subcomponents of radio-frequency signals which are in one polarization direction, are capable of implementing converting signals of the received different subcomponents from radio-frequency signals into intermediate-frequency signals, and send the converted signals to the signal processing unit 15. The transceiving units in each transceiving unit array may further directly send the received different radio-frequency signal subcomponents to the signal processing unit 15; when sending signals, the transceiving units in each transceiving unit array 14 are configured to convert intermediate-frequency signal subcomponents sent by the signal processing unit 15 into radio-frequency signal subcomponents and send the radio-frequency signal subcomponents to the combining-splitting network 12.

The signal processing unit 15, when receiving signals, processes first band intermediate-frequency signals sent by the set of transceiving unit arrays 14 and first band intermediate-frequency signals sent by the pair of receiving units 16, to implement receiving of four first band radio-frequency signals. The signal processing unit 15 may further receive the first band radio-frequency signals sent by the set of transceiving unit arrays 14 and the first band radio-frequency signals sent by the pair of receiving units 16, convert the first band radio-frequency signals into first band intermediate-frequency signals, and process the first band intermediate-frequency signals, to implement receiving of four first band radio-frequency signals. When sending signals, the signal processing unit 15 processes signals of a baseband unit and send the processed signals to the set of transceiving unit arrays 14.

In the transceiving module provided by the embodiment of the present invention, the co-element filter unit divides radio-frequency signals received from the antenna elements into first band radio-frequency signals and second band radio-frequency signals, and sends the first band radio-frequency signals to the set of transceiving unit arrays to implement receiving of two first band radio-frequency signals; the connection point of the pair of receiving units is connected to the combining network of the another transceiving module, to receive first band radio-frequency signals sent by the another transceiving module, to implement receiving of another two first band radio-frequency signals, thereby achieving receiving of four first band signals, and improving uplink network performance of a base station, for example, reducing power required for terminal transmission, extending system coverage and expanding system capacity; besides, the combining network combines second band radio-frequency signals which are sent by each co-element filter unit and in different polarization directions and sends the combined signals to the pair of receiving units in the another transceiving module, for the pair of receiving units and a signal processing unit that are in the another transceiving module to implement receiving of another two second band signals. Through the foregoing transceiving module, receiving of four radio-frequency signals with more than one band is finally achieved, thereby improving the uplink network performance of the base station.

Figure 3:
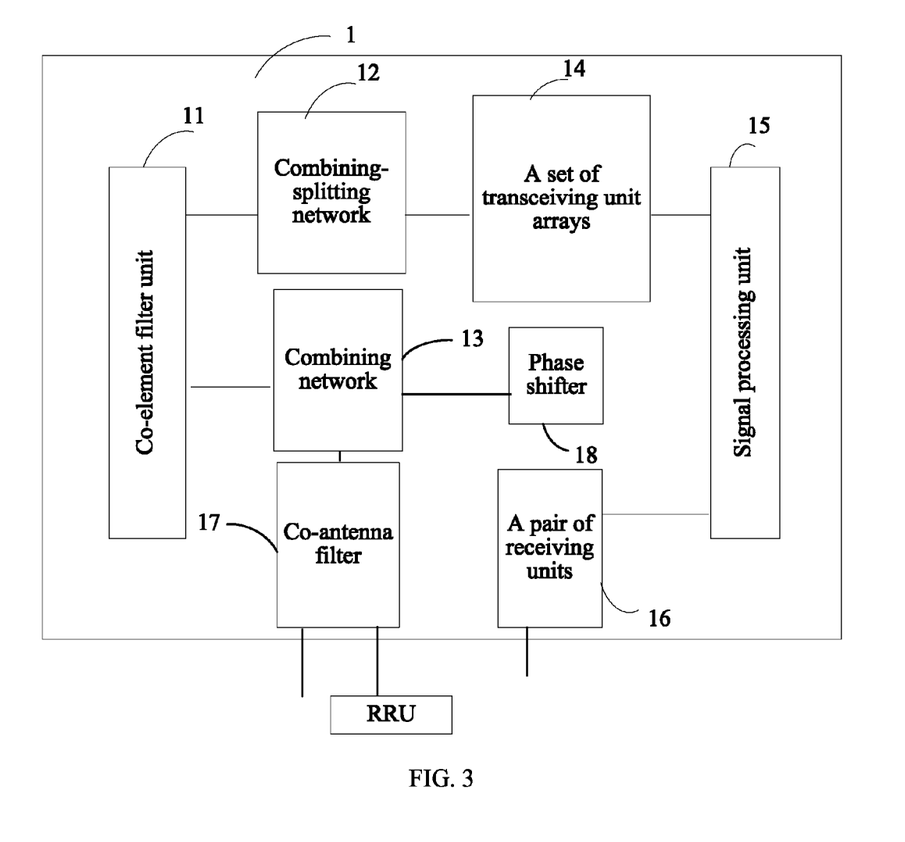
FIG. 3 is a simplified block diagram of a transceiving module according to another embodiment of the present invention.

Further, as shown in FIG. 3, the foregoing transceiving module 1 may include a co-antenna filter 17, with an input port connected to a combining network 13, and an output port setting with a first connection point connected to a pair of receiving units in another transceiving module and a second connection point connected to a radio remote unit respectively, and the co-antenna filter 17 is configured to divide two second band radio-frequency signals sent by the combining network 13 in the transceiving module 1 into two third band radio-frequency signals and two fourth band radio-frequency signals respectively, send the two third band radio-frequency signals to the pair of receiving units in the another transceiving module, and send the two fourth band radio-frequency signals to the radio remote unit. The two signals respectively correspond to two polarization directions of antenna elements. In this way, at the same time when receiving of four first band radio-frequency signals is achieved in the transceiving module 1, the co-antenna filter sends the third band radio-frequency signals to the pair of receiving units in the another transceiving module, for the pair of receiving units and a signal processing unit that are in the another transceiving module to implement receiving of two third band signals. The second connection point of the co-antenna filter is connected to the radio remote unit, to implement signal receiving and sending with antenna elements as a passive antenna. It may be understood that, the radio remote unit in the embodiment of the present invention may be located above or below a tower, independently deployed or integrated with an antenna, may be an independent RRU, and may also be an RRU module integrated with an antenna. Besides, the second connection point may further be connected to a non-distributed base station, to implement signal receiving and sending with antenna elements as a passive antenna. In all embodiments of the present invention, that the second connection point is connected to an RRU is taken as an example for description.

Further, as shown in FIG. 3, the foregoing transceiving module 1 may include a phase shifter 18 connected to the combining network 13. The phase shifter 18 is configured to adjust a phase of third band radio-frequency signals input to the combining network 13 so as to adjust a tilt angle of an antenna connected to the transceiving module 1 when the antenna is used as a passive antenna.

The signal processing module 15 is further configured to control an amplitude and a phase of first band radio-frequency signals sent by the transceiving unit arrays 14 so as to adjust a tilt angle of an antenna connected to the transceiving module 1 when the antenna is used as an active antenna.

In this way, the tilt angle of the active antenna and the tilt angle of the passive antenna may be adjusted independently.

An embodiment of the present invention further provides an antenna, including a first transceiving module 1, a second transceiving module 2, and at least one antenna element array connected to each transceiving module.

Figure 4:
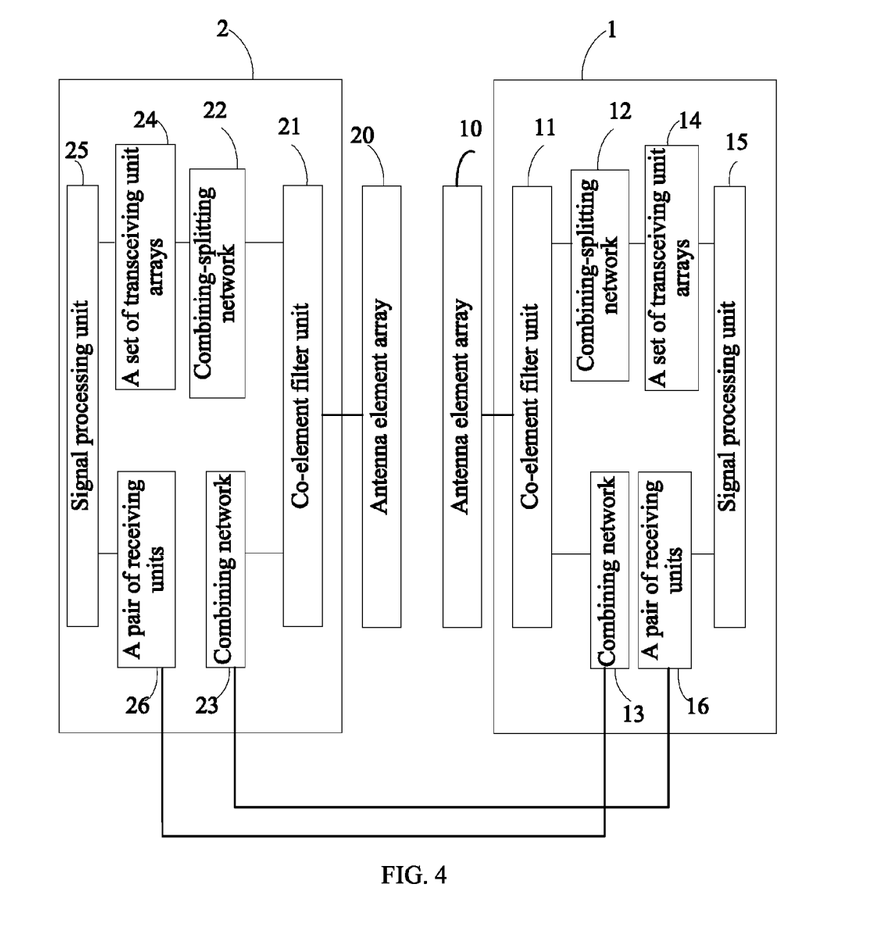
FIG. 4 is a simplified block diagram of an antenna according to an embodiment of the present invention.

FIG. 4 shows a case that each transceiving module 1, 2 is connected to an antenna element array 10, 20. A first antenna element array 10 is connected to the first transceiving module 1, and a second antenna element array 20 is connected to the second transceiving module 2. Each antenna element array includes multiple antenna elements that have two polarization directions. Each transceiving module includes a co-element filter unit 11, a combining-splitting network 12, a combining network 13, a set of transceiving unit arrays 14, a signal processing unit 15 and a pair of receiving units 16. Connection manners of each unit in each transceiving module are the same as those of the transceiving module 1 shown in FIG. 2. Specific connections are described in detail in the foregoing embodiment, and are not repeated here. The co-element filter unit 11 may include one co-element filter or multiple co-element filters, where each co-element filter is connected to a same polarization direction of one or multiple antenna elements in the first antenna element array 10, and the multiple antenna elements connected to each co-element filter may be adjacent antenna elements. A connection point of the pair of receiving units 16 in the first transceiving module 1 is connected to a connection point of a combining network 23 in the second transceiving module 2. A connection point of a combining network 13 in the first transceiving module 1 is connected to a connection point of a pair of receiving units 26 in the second transceiving module 2. The foregoing connections may be implemented by using an external connection manner such as a backboard connection or a cable connection, or by using a manner of internal connections of transceiving modules.

In the antenna provided by the embodiment of the present invention, for the first transceiving module 1, the co-element filter unit in the first transceiving module divides radio-frequency signals received from the antenna element array into first band radio-frequency signals and second band radio-frequency signals, the combining-splitting network combines first band radio-frequency signals in a same polarization direction which are transmitted by n antenna elements to form m signals and sends the m signals to m transceiving units, and then the signal processing unit processes the signals to implement receiving of one first band radio-frequency signal. Two polarization directions of each antenna element cause that receiving of two first band radio-frequency signals is implemented. The pair of receiving units newly added to the first transceiving module 1 receive first band radio-frequency signals sent by the second transceiving module 2, and then the signal processing unit 15 processes the signals to implement receiving of another two first band radio-frequency signals, thereby implementing receiving of four first band radio-frequency signals, and improving uplink network performance of a base station. Besides, the co-element filter unit 11 sends the second band radio-frequency signals to the combining network, and the combining network combines all second band radio-frequency signals sent by the co-element filter unit to form two signals and separately sends the two signals to the pair of receiving units in the second transceiving module 2. For the second transceiving module 2, the co-element filter unit 21 in the second transceiving module 2 divides radio-frequency signals received from the antenna element array into first band radio-frequency signals and second band radio-frequency signals, and then the combining-splitting network 22, the set of transceiving unit arrays 24 and the signal processing unit 25 process the second band radio-frequency signals, to implement receiving of two second band radio-frequency signals. The pair of receiving units 26 newly added to the second transceiving module 2 receives the second band radio-frequency signals sent by the first transceiving module 1, to implement receiving of another two second band radio-frequency signals, thereby implementing receiving of four second band radio-frequency signals, and improving the uplink network performance of the base station. Besides, the co-element filter unit 21 sends the first band radio-frequency signals to the combining network 22, and the combining network combines the first band radio-frequency signals which are in two polarization directions to form two signals and separately sends the two signals to the pair of receiving units in the first transceiving module 1. In this way, the two transceiving modules work together to make full use of the two antenna element arrays to implement receiving of four radio-frequency signals with more than one band, which saves costs and improves the uplink network performance of the base station at the same time.

Figure 5A:
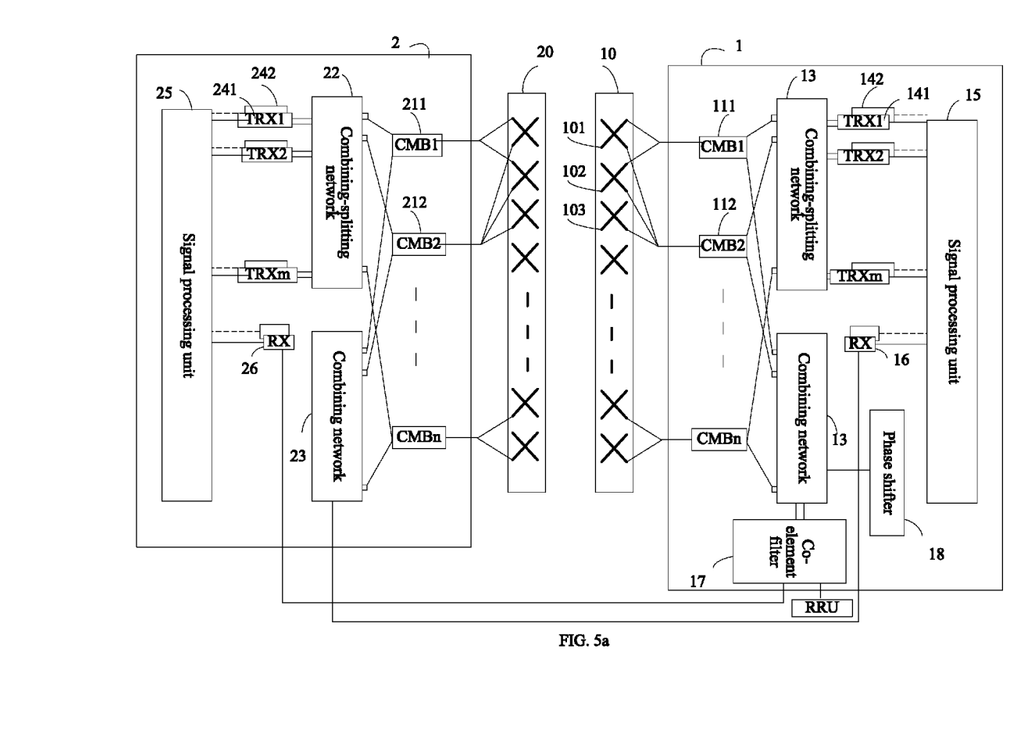
FIG. 5a is a simplified block diagram of an antenna according to another embodiment of the present invention.

An antenna according to another embodiment of the present invention, as shown in FIG. 5*a*, includes a first transceiving module 1, a second transceiving module 2, a first antenna element array 10 and a second antenna element array 20 that are connected to the first transceiving module 1 and the second transceiving module 2 respectively. Definitely, the first transceiving module 1 and the second transceiving module 2 may also separately connect to multiple antenna element arrays. The first transceiving module 1 has a same structure as that of the transceiving module shown in FIG. 3. In all embodiments of the present invention, the same structure refers to that connections between included components are the same. The first transceiving module 1 is configured to implement receiving of four first band radio-frequency signals. Second band radio-frequency signals received by the first transceiving module 1 are input to a combining network 13 in the first transceiving module 1, where the second band radio-frequency signals include third band radio-frequency signals and fourth band radio-frequency signals. The second transceiving module 2 has a same structure as that of the transceiving module shown in FIG. 2, and the second transceiving module 2 is configured to implement receiving of four third band radio-frequency signals. First band radio-frequency signals received by the second transceiving module 2 are input to a combining network in the second transceiving module 2. A connection point of a pair of receiving units 16 in the first transceiving module 1 is connected to a connection point of the combining network 13 in the second transceiving module 2, and a connection point of a pair of receiving units 26 in the second transceiving module 2 is connected to a first connection point of a co-antenna filter 17 in the first transceiving module 1. The foregoing connections may be implemented by using an external connection manner such as a backboard connection or a cable connection, or by using a manner of internal connections of transceiving modules.

Further, a second connection point of the co-antenna filter 17 in the first transceiving module 1 may be connected to an RRU, so that an antenna element array is used as a passive antenna, to implement receiving and sending of fourth band radio-frequency signals.

A structure and receiving principles of the foregoing antenna are described in detail in the following with reference to FIG. 5*a*, wherein a set of antenna element arrays implement receiving of four dual-band radio-frequency signals and dual bands are 1.8 G and 2.6 G, for example.

As shown in FIG. 5a, the antenna includes a first antenna element array 10, a second antenna element array 20, a 2.6 G transceiving module 1 and a 1.8 G transceiving module 2 that are connected to the first antenna element array 10 and the second antenna element array 20 respectively.

The first antenna element array 10 or the second antenna element array 20 includes N (N is a positive integer) antenna elements, and each antenna element has two polarization directions, namely, a first polarization direction and a second polarization direction.

The 2.6 G transceiving module 1 includes:

A co-element filter unit 11 which includes T pairs of co-element filters, and is configured to divide two radio-frequency signals received from two polarization directions of antenna elements into two 1.8-2.1 G radio-frequency signals and two 2.6 G radio-frequency signals, send the two 2.6 G radio-frequency signals to a combining-splitting network 12, and send the 1.8-2.1 G radio-frequency signals to a combining network 13. The co-element filters are divided into first co-element filters 111 and second co-element filters 112; the first co-element filters are connected to a first polarization direction of one or multiple antenna elements (which are generally adjacent antenna elements, and are not limited here), and the second co-element filters are connected to a second polarization direction of one or multiple antenna elements (which are generally adjacent antenna elements, and are not limited here). As shown in FIG. 5a, one of the co-element filters 111 is connected to a first polarization direction of adjacent antenna elements 101 and 102, and one of the co-element filters 112 is connected to a second polarization direction of adjacent antenna elements 101, 102 and 103.

The combining-splitting network 12 is configured to combine T 2.6 G radio-frequency signals in the first polarization direction which are sent by T first co-element filters to form M signals, and send the M signals to M (M is a positive integer) transceiving units in a first transceiving unit array 141; combine T 2.6 G radio-frequency signals in the second polarization direction which are sent by T second co-element filters 112 to form M signals, and send the M signals to M (M is a positive integer) transceiving units in a second transceiving unit array 142.

A set of transceiving unit arrays 14 includes the first transceiving unit array 141 and the second transceiving unit array 142, where each transceiving unit array includes M transceiving units; when receiving signals, 2.6 G radio-frequency signals sent by the combining-splitting network 13 are converted into intermediate-frequency signals and output to a signal processing unit 15; when sending signals, intermediate-frequency signals sent by the signal processing unit 15 are converted into 2.6 G radio-frequency signals and sent to the combining-splitting network 13.

Each transceiving unit may include a filter, an amplifier, a down-conversion receiving unit, an up-conversion transmission unit, an analog to digital converter and a digital to analog converter; the filter, the amplifier, the down-conversion receiving unit and the analog to digital converter may form a receiving channel, and the filter, the amplifier, the up-conversion transmission unit and the digital to analog converter may form a transmitting channel; definitely, the analog to digital converter and the digital to analog converter may not be included in each transceiving unit, but are set in the signal processing unit; one port of the receiving channel and the transmitting channel of each transceiving unit is connected to a signal output port of the combining-splitting network 13, and the other port is connected to the signal processing unit 15.

A transceiving unit includes a receiving channel and a transmitting channel, and the receiving channel and the transmitting channel may share an antenna element through a receiving filter and a transmitting filter.

A pair of receiving units 16 is configured to receive two 2.6 G radio-frequency signals sent by a combining network 23 in a 1.8-2.1 G radio-frequency module 2, convert the 2.6 G band radio-frequency signals into intermediate-frequency signals and output the intermediate-frequency signals to the signal processing unit 15, to implement receiving of two 2.6 G band radio-frequency signals.

Each receiving unit 16 includes the receiving channel formed by the filter, the amplifier, the down-conversion receiving unit and the analog to digital converter; definitely, the analog to digital converter may not be included in each receiving unit, but is set in the signal processing unit; each receiving unit 16 is disposed with a connection point connected to the 1.8 G transceiving module 2, where a connection between a radio-frequency signal output port of the combining network 23 in the 1.8-2.1 G transceiving module 2 and the pair of receiving units 16 in the 2.6 G transceiving module 1 is implemented by using an external connection manner such as a backboard connection or a cable connection, or by using a manner of internal connections of modules.

The signal processing unit 15 is configured to, when receiving signals, process, in a digital domain, intermediate-frequency signals sent by a set of transceiving unit arrays 141 and 142 and the pair of receiving units 16, to implement receiving of four 2.6 G radio-frequency signals; when sending signals, process, in the digital domain, signals of a baseband unit and send the processed signals to the set of transceiving unit arrays 141 and 142.

The signal processing unit 15 may include receiving processing channels, transmission processing channels, a combiner and a serial/parallel conversion unit; the receiving processing channels are connected to the receiving channel of the receiving units 16, and the transmission processing channels are connected to the transmitting channel of the transceiving units.

Specifically, a receiving processing channel may include a digital beam forming receiving unit and a filtering processing unit; definitely, the receiving processing channel may further include an analog to digital converter, and in this case, no analog to digital converter is included in each transceiving unit in the set of transceiving unit arrays 14 and each receiving unit 16; similarly, a transmission processing channel may further include a digital to analog converter, and in this case, no digital to analog converter is included in each transceiving unit in the transceiving unit arrays 14; the foregoing filtering processing unit may include a coefficient extraction filter, a half-band filter, a finite impulse response filter, and so on; the foregoing digital beam forming receiving unit and filtering processing unit are configured to process digital signals in the digital domain.

After each receiving processing channel of the signal processing unit 15 processes digital signals, a combiner accumulates digital signals of each receiving processing channel according to a related algorithm, and transmits the digital signals after combination to a baseband unit BBU.

A phase shifter 18 connected to the combining network 13 is configured to adjust a phase of signals input to the combining network 13, so as to adjust a tilt angle of the first antenna element array 10 connected to the 2.6 G transceiving module 1 when the first antenna element array 10 is used as a passive antenna. The signal processing module 15 is further configured to control an amplitude and a phase of the first band radio-frequency signals received or sent by the transceiving unit arrays 14, so as to adjust a tilt angle of the first antenna element array 10 connected to the 2.6 G transceiving module 1 when the first antenna element array 10 is used as an active antenna.

The combining network 13 combines 1.8-2.1 G radio-frequency signals sent by all the first co-element filters 111 to form one signal, combines 1.8-2.1 G radio-frequency signals sent by all the second co-element filters 112 to form one signal, and sends the foregoing two signals to a co-antenna filter 17.

The co-antenna filter 17, with an input port connected to the combining network 13, and an output port setting with a first connection point connected to a pair of receiving units 24 in a 1.8-2.1 G transceiving module 2 and a second connection point connected to a radio remote unit respectively, and the co-antenna filter 17 is configured to divide two 1.8-2.1 G radio-frequency signals sent by the combining network 13 in the 2.6 G transceiving module 1 into two 1.8 G radio-frequency signals and two 2.1 G radio-frequency signals, send the two 1.8 G radio-frequency signals to the pair of receiving units 24 in the 1.8-2.1 G transceiving module 2, and send the two 2.1 G radio-frequency signals to the radio remote unit; in this way, at the same time when receiving of four 2.6 G radio-frequency signals in the 2.6 G transceiving module 1 is implemented, the co-antenna filter sends the 1.8 G radio-frequency signals to the pair of receiving units in the 1.8 G transceiving module 2, for the 1.8 G transceiving module 2 to implement receiving of four 1.8 G signals; the second connection point of the co-antenna filter may be connected to the radio remote unit, to implement signal receiving and sending with the antenna element array 10 as a passive antenna.

The 1.8 G transceiving module 2 includes:

A co-element filter unit 21 which includes T pairs of co-element filters, and is configured to divide two radio-frequency signals received from two polarization directions of antenna elements into two 1.8-2.1 G radio-frequency signals and two 2.6 G radio-frequency signals, send the two 1.8 G radio-frequency signals to a combining-splitting network 22, and send the two 2.6 G radio-frequency signals to the combining network 23. Each pair of co-element filters includes a first co-element filter 211 and a second co-element filter 212 that correspond to two polarization directions respectively, and for a connection manner, reference may be made to the connection manner of the co-element filter unit 11 in the 2.6 G transceiving module, and details are not repeatedly described here.

The combining-splitting network 22 combines T 1.8 G radio-frequency signals sent by all first co-element filters 211 to form M signals, and sends the M signals to M (M is a positive integer) receiving units in a first transceiving unit array 241; combines T 1.8 G radio-frequency signals sent by all second co-element filters 212 to form M signals, and sends the M signals to M (M is a positive integer) receiving units in a second transceiving unit array 242.

A set of transceiving unit arrays 24 includes the first transceiving unit array 241 and the second transceiving unit array 242, where each transceiving unit array includes M transceiving units; when receiving signals, 1.8 G radio-frequency signals sent by the combining-splitting network 22 are converted into intermediate-frequency signals and output to a signal processing unit 25; when sending signals, 1.8 G intermediate-frequency signals sent by the signal processing unit 25 are converted into 1.8 G radio-frequency signals and sent to the combining-splitting network 22.

A pair of receiving units 26 is configured to receive two 1.8 G radio-frequency signals sent by the co-antenna filter 17 in the 2.6 G transceiving module 1, convert the 1.8 G band radio-frequency signals into intermediate-frequency signals, and output the intermediate-frequency signals to the signal processing unit 25, to implement receiving of two 1.8 G band radio-frequency signals; where each receiving unit 26 is disposed with a connection point connected to the 2.6 G transceiving module 1, where a connection between a radio-frequency signal output port of the co-antenna filter 17 in the 2.6 G transceiving module 1 and the pair of receiving units 26 in the 1.8 G transceiving module 2 is implemented by using an external connection manner such as a backboard connection or a cable connection, or by using a manner of internal connections of modules.

The signal processing unit 25 is configured to, when receiving signals, process 1.8 G radio-frequency signals sent by the set of transceiving unit arrays 24 and the pair of receiving units 26, to implement receiving of four 1.8 G radio-frequency signals; when sending signals, process signals of the baseband unit and send the signals to the set of transceiving unit arrays 24.

The combining network 23 combines 2.6 G radio-frequency signals sent by all first co-element filters 211 to form one signal, combines 2.6 G radio-frequency signals sent by all second co-element filters 212 to form one signal, and sends the foregoing two signals to the pair of receiving units 16 in the 2.6 G transceiving module 1.

It needs to be noted that, the foregoing 1.8 G transceiving module 2 may be replaced with a 2.1 G transceiving module 2. Specifically, in the 2.1 G transceiving module 2, a set of transceiving unit arrays 24 is configured to receive or send 2.1 G radio-frequency signals; a pair of receiving units 26 is configured to receive two 2.1 G radio-frequency signals sent by the co-antenna filter 17 in the 2.6 G transceiving module 1. A connection point of a 2.1 G radio-frequency signal output port of the co-antenna filter 17 in the 2.6 G transceiving module 1 is connected to a connection point of the pair of receiving units 26 in the 2.1 G transceiving module 2 by a manner of an internal module or an external connection, and a connection point of a 1.8 G radio-frequency signal output port of the co-antenna filter 17 in the 2.6 G transceiving module 1 is connected to a radio remote unit by a manner of an internal module or an external connection, so that the antenna element array 10 is used as a passive antenna.

Figure 5B:
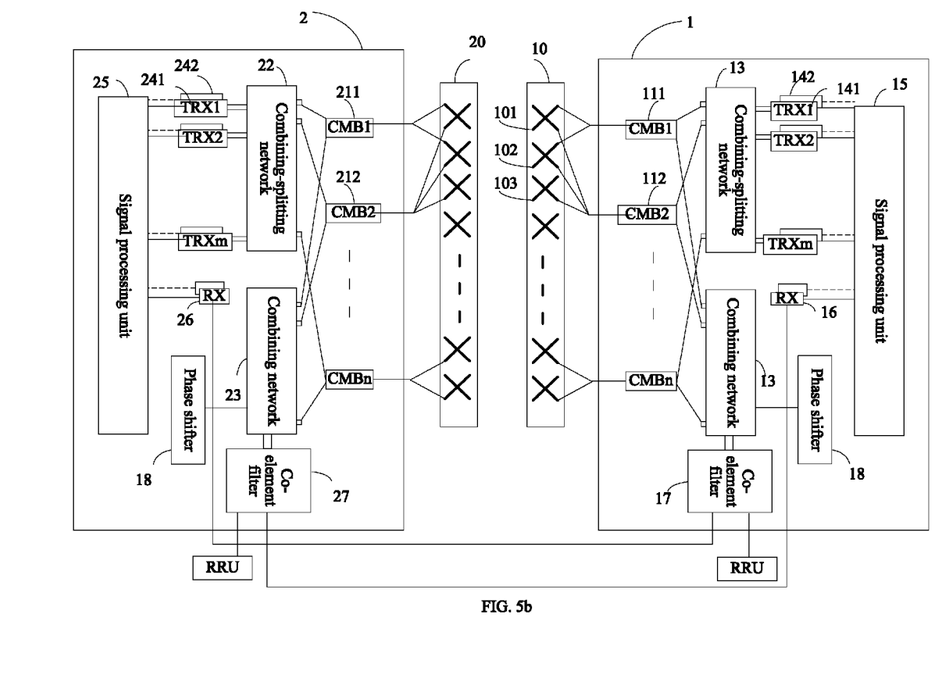
FIG. 5b is a simplified block diagram of an antenna according to another embodiment of the present invention.

An antenna provided by another embodiment of the present invention, as shown in FIG. 5b, includes a first transceiving module 1, a second transceiving module 2, a first antenna element array 10 and a second antenna element array 20 that are connected to the first transceiving module 1 and the second transceiving module 2 respectively. A structure of the first transceiving module 1 and the second transceiving module 2 is the same as that of the transceiving module shown in FIG. 3. The first transceiving module 1 is configured to implement receiving of four first band radio-frequency signals, and second band radio-frequency signals input to a combining network 13 in the first transceiving module 1 include third band radio-frequency signals and fourth band radio-frequency signals. The second transceiving module 2 is configured to implement receiving of four third band radio-frequency signals; compared with the antenna according to the foregoing embodiment, a difference lies in that, fifth band radio-frequency signals input to a combining network 23 in the second transceiving module 2 include first band radio-frequency signals and sixth band radio-frequency signals. A connection point of a pair of receiving units 16 in the first transceiving module 1 is connected to a first connection point of a co-antenna filter 27 in the second transceiving module 2, and a connection point of a pair of receiving units 26 in the second transceiving module 2 is connected to a first connection point of a co-antenna filter 17 in the first transceiving module 1.

Further, a second connection point of the co-antenna filter 17 in the first transceiving module 1 and a second connection point of the co-antenna filter 27 in the second transceiving module 2 may both be connected to an RRU, so that the first antenna element array and the second antenna element array may both be used as a passive antenna, to implement receiving and/or transmitting of fourth band radio-frequency signals and sixth band radio-frequency signals respectively. The fourth band and the sixth band may be a same band and be sent to a same RRU after combination, or may be different bands connected to different RRUs.

Figure 6:
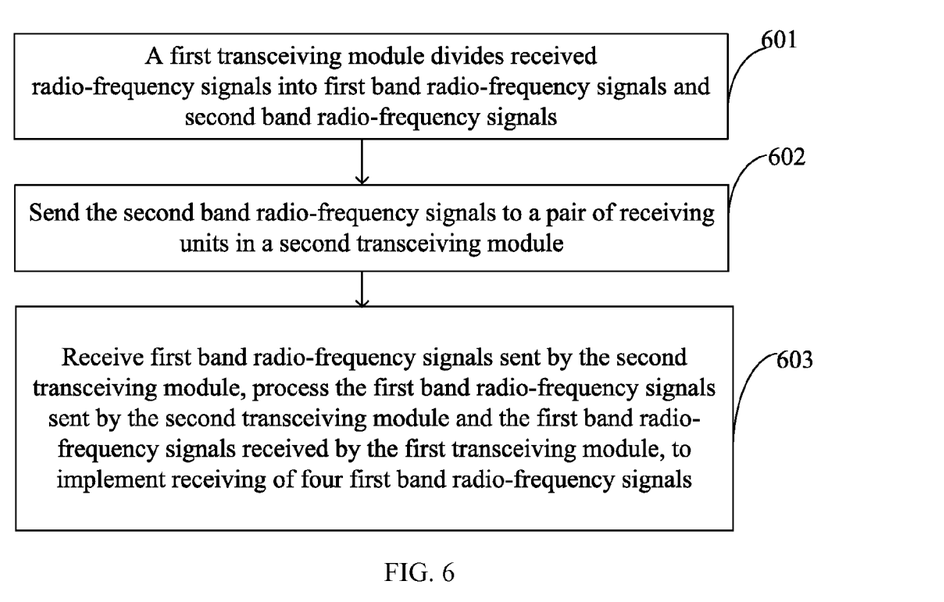
FIG. 6 is a flowchart of a signal receiving method according to an embodiment of the present invention.

On the basis of the foregoing embodiments, an embodiment of the present invention provides a signal receiving method, as shown in FIG. 6, where the method includes:

601: A first transceiving module divides received radio-frequency signals into first band radio-frequency signals and second band radio-frequency signals.

The first band radio-frequency signals include two signals in different polarization directions, and the second band radio-frequency signals include two signals in different polarization directions.

602: Send the second band radio-frequency signals to a pair of receiving units in a second transceiving module.

603: Receive first band radio-frequency signals sent by the second transceiving module, convert the first band radio-frequency signals sent by the second transceiving module and the foregoing first band radio-frequency signals received by the first transceiving module into intermediate-frequency signals, and process the intermediate-frequency signals, to implement receiving of four first band radio-frequency signals.

In this step, when the second transceiving module is the transceiving module shown in FIG. 2, the first band radio-frequency signals sent by the second transceiving module 2 are sent by a combining network in the second transceiving module 2 to a pair of receiving units in the first transceiving module 1. For example, the second transceiving module 2 divides received radio-frequency signals into first band radio-frequency signals and second band radio-frequency signals, and sends the first band radio-frequency signals to the pair of receiving units in the first transceiving module 1 through the combining network in the second transceiving module 2.

When the second transceiving module is the transceiving module shown in FIG. 3, the first band radio-frequency signals sent by the second transceiving module 2 are sent by a co-antenna filter in the second transceiving module 2 to a pair of receiving units in the first transceiving module 1. For example, the second transceiving module first divides received radio-frequency signals into fifth band radio-frequency signals and second band radio-frequency signals, divides the fifth band radio-frequency signals into first band radio-frequency signals and sixth band radio-frequency signals, and sends the first band radio-frequency signals to the pair of receiving units in the first transceiving module 1 through the co-antenna filter in the second transceiving module 2. Further, the second transceiving module 2 may send the sixth band radio-frequency signals to a radio remote unit, for the radio remote unit to implement receiving of six band radio-frequency signals.

Further, the foregoing method may also include:

Separately adjust a phase of signals input to antenna element arrays through a signal processing unit and/or a phase shifter, to implement independent adjustment of a tilt angle when the antenna element arrays are used as an active antenna and/or a passive antenna.

In the signal receiving method provided by the embodiment of the present invention, the first transceiving module 1 divides received radio-frequency signals into first band radio-frequency signals and second band radio-frequency signals, sends the second band radio-frequency signals to the pair of receiving units in the transceiving module 2, for the second transceiving module 2 to implement receiving of four second band radio-frequency signals; meanwhile, the first transceiving module 1 receives first band radio-frequency signals sent by the second transceiving module 2, in combination with the first band radio-frequency signals received by the first transceiving module 1, to implement receiving of four first band radio-frequency signals; the second transceiving module 2 may divide received radio-frequency signals into first band radio-frequency signals and second band radio-frequency signals, and sends the first band radio-frequency signals to the pair of receiving units in the first transceiving module 1, for the first transceiving module 1 to implement receiving of four second band radio-frequency signals; the second transceiving module 2 may further receive the second band radio-frequency signals sent by the first transceiving module 1, in combination with the second band radio-frequency signals received by the second transceiving module 2, to implement receiving of four second band radio-frequency signals.

Another embodiment of the present invention provides a signal receiving method. Compared with the method provided by the foregoing embodiment, a difference lies in that step 602 is replaced with step 602'.

602': Divide the second band radio-frequency signals into third band radio-frequency signals and fourth band radio-frequency signals, and send the third band radio-frequency signals to a pair of receiving units in the second transceiving module.

Further, in step 603, the first band radio-frequency signals sent by the second transceiving module 2 may be sent by a co-antenna filter in the second transceiving module 2 to a pair of receiving units in the first transceiving module 1. For example, the second transceiving module 2 first divides received radio-frequency signals into fifth band radio-frequency signals and second band radio-frequency signals, where the second band radio-frequency signals include the third band radio-frequency signals, converts the third band radio-frequency signals sent by the first transceiving module 1 and the foregoing third band radio-frequency signals received by the second transceiving module into intermediate-frequency signals, and processes the intermediate-frequency signals, to implement receiving of four third band radio-frequency signals. The second transceiving module 2 may divide the fifth band radio-frequency signals into first band radio-frequency signals and sixth band radio-frequency signals, and sends the first band radio-frequency signals to the pair of receiving units in the first transceiving module 1 through the co-antenna filter in the second transceiving module 2. Further, the second transceiving module 2 may also send the sixth band radio-frequency signals to a radio remote unit, for the radio remote unit to implement receiving of six band radio-frequency signals.

After step 602', the method may further include:

604': Send the fourth band radio-frequency signals to the radio remote unit, for the radio remote unit to implement receiving of fourth band radio-frequency signals.

Further, the foregoing method may include:

Separately adjust a phase of signals input to antenna element arrays through a signal processing unit and/or a phase shifter, to implement independent adjustment of a tilt angle when the antenna element arrays are used as an active antenna and/or a passive antenna.

An embodiment of the present invention provides a base station, where the base station includes any antenna according to the foregoing embodiments. Receiving of four radio-frequency signals with more than one band may be implemented, and uplink network performance of a base station may be improved.

An embodiment of the present invention provides a communication system, where the communication system includes the base station according to the foregoing embodiment.

In the embodiments of the present invention, receiving of four dual-band signals is described in detail. It may be understood that, if more than one pair of receiving units, instead of only one pair of receiving units are provided in the foregoing embodiments, receiving of more than four dual-band signals may be implemented; if received radio-frequency signals are not only dual bands, by extending a corresponding co-element filter unit, combining-splitting network and transceiving unit arrays, receiving of radio-frequency signals with more than two bands may be implemented; if the combining network is not only combining of dual bands, but is extended to combining of more than two bands, a connection to multiple different RRUs or receiving of multiple bands of one RRU may be implemented. Besides, because a receiving process and a transmission process are generally inverse, through proper changes, the method, the module, an apparatus and the system according to the embodiments of the present invention may also be used for transmitting more than four signals with more than two bands, where the proper changes may include but are not limited to utilizing a splitting function of the combining network, utilizing a combining function of the co-antenna filter, adding a transmitting channel, and so on.

Moreover, when the antenna element arrays according to the embodiments of the present invention are used as a passive antenna, the second connection point of the co-antenna filter may be connected to an RRU, but the present invention is not limited to this, and the second connection point of the co-antenna filter may also be connected to a non-distributed base station.

Optionally, the combining network according to the embodiments of the present invention may also adopt a structure similar to that of the combining-splitting network. In other words, T signals which are received from the co-antenna filter unit and in one polarization direction are combined to from U signals. In this case, one pair of receiving units is changed to U pairs of receiving units, configured to receive the foregoing U signals. U and T are positive integers, and U is not greater than T. Evidently, when U is equal to T, the combining network may be omitted. Further, in this manner, if the antenna element arrays are also used as a passive antenna, the co-antenna filter may adopt a structure which is similar to that of the co-element filter unit in which multiple filters are included. In this case, before the co-antenna filer and the RRU are connected, one combining-splitting network may be deployed to combine or divide signals, thereby implementing signal receiving and sending when the antenna element arrays are used as a passive antenna.

It may be understood that, the foregoing changes or other changes made according to the ideas of the present invention should fall within the protection scope of the present invention.

It may be understood that, each functional unit according to the embodiments of the present invention may be integrated into a processing unit, each unit may also exist independently and physically, and two or more than two units may also be integrated into a unit. For example, the combing network and the co-antenna filter may be a processing unit, or the co-element filter, the combining-splitting network and the combining network may be a processing unit, which is not enumerated here.

Persons of ordinary skill in the art may be aware that the units and steps of various examples described in conjunction with the embodiments disclosed here can be implemented by electronic hardware, or a combination of computer software and electronic hardware. Whether these functions are performed by using a manner of hardware or software depends on specific applications and design constraints of the technical solutions. Persons skilled in the art may use different methods to implement the described functions for each specific application. However, such implementation should not be considered as beyond the scope of the present invention.

When being implemented in the form of a software function unit and sold or used as a stand-alone product, the functions may be stored in a computer-readable storage medium. Based on such understanding, the essence of the technical solutions of the present invention, or part that makes contributions to the prior art, or part of the technical solutions may be embodied in the form of a software product. The computer software product may be stored in a storage medium, and includes several instructions for instructing a computer device (for example, which may be a personal computer, a server, or a network device) to execute all or part of the steps of the method in each embodiment of the present invention. The storage medium includes: any medium that is capable of storing program code, such as a U-disk, a removable hard disk, a read-only memory (ROM, Read-Only Memory), a random access memory (RAM, Random Access Memory), a magnetic disk, or an optical disk.

Finally, it should be noted that the foregoing embodiments are merely provided for describing the technical solutions of the present invention, but not intended to limit the present invention. Although the present invention is described in detail with reference to the foregoing embodiments, it should be understood by persons of ordinary skill in the art that they may still make modifications to the technical solutions described in each of the embodiments, or equivalent replacements to part of technical features in the technical solutions; however, these modifications or replacements do not make the essence of corresponding technical solutions depart from the spirit and scope of the technical solutions in each of the embodiments of the present invention.

What is claimed is:

1. A first transceiving apparatus comprising:
   a first filter configured to divide radio-frequency signals having two polarization directions received from first antenna elements into first radio-frequency signals having a first band and second radio-frequency signals having a second band, the first radio-frequency signals comprise two signals corresponding to the two polarization directions of the first antenna elements, respectively, the second radio-frequency signals comprise two signals corresponding to the two polarization directions of the first antenna elements, respectively;
   a first processor coupled to the first filter, wherein the first processor is configured to receive the first radio-frequency signals from the first filter, and process the received first radio-frequency signals;
   a pair of receivers configured to receive third radio-frequency signals having the first band being sent from a second transceiving apparatus through a first connection point and process the received third radio-frequency signals, wherein the third radio-frequency signals comprise two signals corresponding to two polarization directions of second antenna elements, respectively; and a signal processor configured to receive the processed first radio-frequency signals and the processed third radio-frequency signals.

2. The first transceiving apparatus as claimed in claim 1, further comprising:

a second signal processor coupled to the first filter and set with a second connection point, wherein the second processor is configured to receive the second radio-frequency signals from the first filter and combine the second radio-frequency signals in each of the two polarization directions.

3. The first transceiving apparatus as claimed in claim 2, wherein the second processor is configured to send the combined second radio-frequency signals having the second band through the second connection point to the second transceiving apparatus.

4. The first transceiving apparatus as claimed in claim 2, further comprising:

a second filter with an input connected to the second connection point and an output set with a third connection point connected to the second transceiving apparatus, wherein the second filter is configured to divide the combined second radio-frequency signals into fourth radio-frequency signals having a third band and fifth radio-frequency signals having a fourth band, and send the fourth radio-frequency signals having the third band to the second transceiving apparatus through the third connection point, the fourth radio-frequency signals comprise two signals corresponding to the two polarization directions of the antenna elements, respectively.

5. The first transceiving apparatus as claimed in claim 4, wherein the output of the second filter is further set with a fourth connection point, wherein the second filter is further configured to send the fifth radio-frequency signals having the fourth band to a radio remote unit or a non-distributed base station through the fourth connection point.

6. The first transceiving apparatus as claimed in claim 5, wherein the first transceiving apparatus further comprises a phase shifter coupled to the second processor, the phase shifter is configured to adjust a phase of the fifth radio-frequency signals, so as to adjust a tilt angle of an antenna element array coupled to the first transceiving apparatus when the antenna element array is used as a passive antenna.

7. The first transceiving apparatus as claimed in claim 1, wherein the signal processor is further configured to control an amplitude and a phase of the first radio-frequency signals, so as to adjust a tilt angle of an antenna element array coupled to the first transceiving apparatus when the antenna element array is used as an active antenna.

8. A signal receiving method, the method comprising:

receiving radio-frequency signals with two polarization directions from first antenna elements by a first transceiving apparatus;

dividing the radio-frequency signals by the first transceiving apparatus into first radio-frequency signals having a first band and second radio-frequency signals having a second band, wherein the first radio-frequency signals comprise two signals corresponding to the two polarization directions of the first antenna elements, respectively, the second radio-frequency signals comprise two signals corresponding to the two polarization directions of the first antenna elements, respectively;

receiving third radio-frequency signals having the first band from a second transceiving apparatus by the first transceiving apparatus, wherein the third radio-frequency signals comprise two signals corresponding to two polarization directions of second antenna elements, respectively; and processing the first radio-frequency signals having the first band and the third radio-frequency signals having the first band by the first transceiving apparatus.

9. The signal receiving method as claimed in claim 8, further comprising:

sending the second radio-frequency signals having the second band to the second transceiving apparatus by the first transceiving apparatus.

10. The signal receiving method as claimed in claim 8, further comprising:

dividing the second radio-frequency signals into fourth radio-frequency signals having a third band and fifth radio-frequency signals having a fourth band by the first transceiving apparatus, the fourth radio-frequency signals comprise two signals corresponding to the two polarization directions of the first antenna elements, respectively; and sending the fourth radio-frequency signals having the third band to the second transceiving apparatus by the first transceiving apparatus.

11. The signal receiving method as claimed in claim 10, further comprising:

sending the fifth radio-frequency signals to a radio remote unit or a non-distributed base station by the first transceiving apparatus.

12. The signal receiving method as claimed in claim 11, further comprising:

adjusting a phase of the fifth radio-frequency signals by the first transceiving apparatus, to implement adjustment of a tilt angle of a first antenna element array coupled to the first transceiving apparatus when the first antenna element array comprises a passive antenna.

13. The signal receiving method as claimed in claim 8, further comprising:

adjusting an amplitude and a phase of the first radio-frequency signals by the first transceiving apparatus to implement adjustment of a tilt angle of a first antenna element array coupled to first transceiving apparatus when the first antenna element array comprises an active antenna.

14. An antenna system comprising a first transceiving apparatus and a second transceiving apparatus, wherein the first transceiving apparatus comprises a first connection point and a second connection point, and wherein the second transceiving apparatus comprises a third connection point connected to the second connection point of the first transceiving apparatus an a fourth connection point connected to the first connection point of the first transceiving apparatus, wherein the first transceiving apparatus is configured to divide radio-frequency signals with two polarization directions received from first antenna elements into first radio-frequency signals comprising a first band and second radio-frequency signals comprising a second band, the first radio-frequency signals comprise two signals corresponding to the two polarization directions of the first antenna elements, respectively, the second radio-frequency signals comprises third radio-frequency signals comprising a third band, the third radio-frequency signals comprise two signals corresponding to the two polarization directions of the first antenna elements, respectively, wherein the first transceiving apparatus is configured to send the third radio-frequency signals to the second transceiving apparatus through the second connection point, wherein the second transceiving apparatus is configured to divide radio-frequency signals with two polarization directions received from second antenna elements into fourth radio-frequency signals comprising the third band and fifth radio-frequency signals comprising a fourth band, the fourth radio-frequency signals comprise two signals corresponding to the two polarization directions of the second antenna elements, respectively, the fifth radio-frequency signals comprise sixth radio-frequency signals comprising the first band, the sixth radio-frequency signals comprise two signals corresponding to the two polarization directions of the second antenna elements, respectively, wherein the second transceiving apparatus is configured to send the sixth radio-frequency signals to the first transceiving apparatus through the fourth connection point, wherein the first transceiving apparatus is configured to receive the sixth radio-frequency signals having the first band from the second transceiving through the first connection point, and to process the first radio-frequency signals having the first band and the sixth radio-frequency signals having the first band, wherein the second transceiving apparatus is configured to receive the third radio-frequency signals having the third band from the first transceiving through the third connection point and to process the fourth radio-frequency signals having the third band and the fourth radio-frequency signals having the third band.

15. The antenna system as claimed in claim 14, wherein the second radio-frequency signals comprising the second band are the third radio-frequency signals comprising the third band, and the fifth radio-frequency signals comprising the fourth band are the sixth radio-frequency signals comprising the first band.

16. The antenna system as claimed in claim 14, wherein the second radio-frequency signals comprising the second band comprise the third radio-frequency signals comprising the third band and seventh radio-frequency signals comprising a fifth band, and the fifth radio-frequency signals comprising the fourth band are the sixth radio-frequency signals comprising the first band, wherein the first transceiving apparatus is further configured to divide the second radio-frequency signals into the third radio-frequency signals and the seventh radio-frequency signals.

17. The antenna system as claimed in claim 16, wherein the first transceiver apparatus further comprises a fifth connection point, wherein the antenna system further comprises at least one radio remote unit connected to the fifth connection point.

18. The antenna system as claimed in claim 14, wherein the second radio-frequency signals comprising the second band comprise the third radio-frequency signals having the third band and seventh radio-frequency signals comprising a fifth band, and the fifth radio-frequency signals comprising the fourth band comprise the sixth radio-frequency signals comprising the first band and eighth radio-frequency signals comprising a sixth band, wherein the first transceiving apparatus is further configured to divide the second radio-frequency signals into the third radio-frequency signals and the seventh radio-frequency signals, and wherein the second transceiving apparatus is further configured to divide the fifth radio-frequency signals into the sixth radio-frequency signals and the eighth radio-frequency signals.

19. The antenna system as claimed in claim 18, wherein the first transceiver apparatus further comprises a fifth connection point, the second transceiver apparatus further comprises a sixth connection point, and wherein the antenna system further comprises at least one radio remote unit, connected to at least one of the fifth connection point and the sixth connection point.

* * * * *